(12) United States Patent
Morrill et al.

(10) Patent No.: US 7,966,286 B2
(45) Date of Patent: Jun. 21, 2011

(54) HIERARCHICAL MANAGEMENT OF OBJECT SCHEMA AND BEHAVIOR

(75) Inventors: Jason Morrill, Redmond, WA (US); Hai Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/305,050

(22) Filed: Dec. 16, 2005

(65) Prior Publication Data

US 2006/0184571 A1 Aug. 17, 2006

Related U.S. Application Data

(63) Continuation-in-part of application No. 11/058,096, filed on Feb. 14, 2005, now Pat. No. 7,653,653.

(51) Int. Cl.
*G06F 7/00* (2006.01)

(52) U.S. Cl. ............... 707/625; 707/628; 707/695

(58) Field of Classification Search .......... 707/623–631, 707/632, 790, 609, 613, 695
See application file for complete search history.

(56) References Cited

U.S. PATENT DOCUMENTS

| | | | | |
|---|---|---|---|---|
| 5,742,813 | A | * | 4/1998 | Kavanagh et al. ............ 707/8 |
| 5,794,030 | A | * | 8/1998 | Morsi et al. ............ 707/103 R |
| 5,842,223 | A | | 11/1998 | Bristor ............ 707/204 |
| 5,860,073 | A | | 1/1999 | Ferrel et al. |
| 5,878,415 | A | * | 3/1999 | Olds ............ 1/1 |
| 5,893,107 | A | | 4/1999 | Chan et al. ............ 707/103 R |
| 5,893,913 | A | * | 4/1999 | Brodsky et al. ............ 1/1 |
| 5,913,063 | A | * | 6/1999 | McGurrin et al. ............ 717/109 |
| 5,920,725 | A | * | 7/1999 | Ma et al. ............ 717/171 |
| 5,940,834 | A | * | 8/1999 | Pinard et al. ............ 707/102 |
| 5,956,736 | A | * | 9/1999 | Hanson et al. ............ 715/234 |
| 6,026,408 | A | * | 2/2000 | Srinivasan et al. ............ 707/103 R |
| 6,038,567 | A | * | 3/2000 | Young ............ 707/103 R |
| 6,047,289 | A | * | 4/2000 | Thorne et al. ............ 707/10 |

(Continued)

FOREIGN PATENT DOCUMENTS

EP 1557757 12/2004

OTHER PUBLICATIONS

Incremental maintenance of materialized object-oriented views in MultiView: strategies and performance evaluation http://ieexplore.ieee.org/search/wrapper.isp?arnumber=729731.

(Continued)

*Primary Examiner* — Robert Timblin
*Assistant Examiner* — James E Richardson
(74) *Attorney, Agent, or Firm* — Merchant & Gould, P.C.

(57) ABSTRACT

A method of reusing an object type in a computing environment, the method comprising accepting modifications made to an object type at a source data site in a first computing environment storing the object type, the object type comprising schema and behaviors, wherein the modifications are made to at least one of the schema or behaviors of the object type at the source data site; applying the modifications made to the at least one of the schema or behaviors of the object type at the source data site to an object type schema and behavior at a destination data site in a second computing environment, the object type at the destination data site corresponding to the object type at the source data site; and applying the modifications to an existing object created based on the object type at the destination data site in the second computing environment.

20 Claims, 15 Drawing Sheets

U.S. PATENT DOCUMENTS

| | | | |
|---|---|---|---|
| 6,094,657 | A | 7/2000 | Hailpern et al. |
| 6,230,173 | B1 | 5/2001 | Ferrel et al. |
| 6,272,495 | B1 | 8/2001 | Hetherington ................ 707/101 |
| 6,336,211 | B1 | 1/2002 | Soe .............................. 717/108 |
| 6,360,230 | B1 | 3/2002 | Chan et al. ................ 707/103 R |
| 6,370,542 | B1* | 4/2002 | Kenyon ..................... 707/103 R |
| 6,405,220 | B1* | 6/2002 | Brodersen et al. ............. 707/202 |
| 6,425,016 | B1 | 7/2002 | Banavar et al. |
| 6,446,077 | B2* | 9/2002 | Straube et al. ............ 707/103 Y |
| 6,584,480 | B1 | 6/2003 | Ferrel et al. |
| 6,591,272 | B1* | 7/2003 | Williams ...................... 707/102 |
| 6,601,233 | B1* | 7/2003 | Underwood .................. 717/102 |
| 6,615,223 | B1* | 9/2003 | Shih et al. ..................... 707/201 |
| 6,754,885 | B1* | 6/2004 | Dardinski et al. ............ 717/113 |
| 6,859,217 | B2 | 2/2005 | Robertson et al. |
| 6,915,287 | B1* | 7/2005 | Felsted et al. ......................... 1/1 |
| 6,957,229 | B1* | 10/2005 | Dyor ......................... 707/103 X |
| 7,072,911 | B1* | 7/2006 | Doman et al. ................. 707/615 |
| 7,146,565 | B2 | 12/2006 | Toyama et al. |
| 7,155,491 | B1 | 12/2006 | Schultz et al. |
| 7,249,118 | B2 | 7/2007 | Sandler et al. .................... 707/1 |
| 7,392,234 | B2 | 6/2008 | Shaath et al. |
| 7,607,164 | B2 | 10/2009 | Vasishth et al. |
| 2001/0011287 | A1 | 8/2001 | Goto et al. |
| 2002/0138513 | A1 | 9/2002 | Korotney et al. |
| 2002/0143521 | A1 | 10/2002 | Call .................................. 704/1 |
| 2002/0174142 | A1 | 11/2002 | Demers et al. |
| 2002/0184264 | A1 | 12/2002 | Berg et al. |
| 2003/0014442 | A1* | 1/2003 | Shiigi et al. .................... 707/513 |
| 2003/0050937 | A1 | 3/2003 | Lusen et al. ............... 707/104.1 |
| 2003/0225840 | A1 | 12/2003 | Glassco et al. |
| 2003/0237046 | A1 | 12/2003 | Parker et al. |
| 2004/0019639 | A1* | 1/2004 | E et al. .......................... 709/205 |
| 2004/0073782 | A1 | 4/2004 | Price et al. |
| 2004/0123234 | A1 | 6/2004 | Anderson et al. |
| 2004/0205592 | A1 | 10/2004 | Huang |
| 2004/0225652 | A1 | 11/2004 | Duncan et al. |
| 2004/0267595 | A1 | 12/2004 | Woodings et al. ................. 705/9 |
| 2005/0010580 | A1* | 1/2005 | Lancefield .................... 707/100 |
| 2005/0015436 | A1* | 1/2005 | Singh et al. ................... 709/203 |
| 2005/0076036 | A1* | 4/2005 | Le .................................. 707/100 |
| 2005/0091192 | A1 | 4/2005 | Probert et al. ..................... 707/1 |
| 2005/0091637 | A1 | 4/2005 | Schechter et al. |
| 2005/0102324 | A1 | 5/2005 | Spring et al. |
| 2005/0108225 | A1 | 5/2005 | Chau |
| 2005/0114479 | A1 | 5/2005 | Watson-Luke |
| 2005/0149582 | A1* | 7/2005 | Wissmann et al. ........... 707/201 |
| 2006/0004820 | A1 | 1/2006 | Claudatos et al. |
| 2006/0087669 | A1 | 4/2006 | Yamaguchi et al. |
| 2006/0184507 | A1 | 8/2006 | Lefferts et al. ..................... 707/2 |
| 2006/0184571 | A1 | 8/2006 | Liu et al. ................... 707/103 R |
| 2006/0200751 | A1 | 9/2006 | Underwood et al. |

OTHER PUBLICATIONS

Using object-oriented principles to optimize update propagation to materialized views http://ieexplore.ieee.org/search/wrapper.isp?arnumber=492178.

The Role of Polymorphic Reuse Mechanisms in Schema Evolution in an Object-Oriented Database http://ftp.ccs.neu.edu/pub/research/demeter/documents/papers/LZHL94-polymorphic-reuse.ps.

Design and Implementation of ET++, a Seamless Object-Oriented Application Framework http://www.ubilab.org/publications/printversions/pdf/wei89.pdf.

Altova, STYLEVISION 2004 User Manual, May 17 2004, Altova, pp. 1, 2, 13-15, 27-30, 263, and 275-277.

Notice of Allowance mailed Sep. 8, 2009 in U.S. Appl. No. 11/058,096.

Non-Final Office Action mailed Sep. 10, 2008 in U.S. Appl. No. 11/058,096.

Response to Non-Final Office Action mailed Sep. 10, 2008 in U.S. Appl. No. 11/058,096, filed Dec. 10, 2008.

Non-Final Office Action mailed Jun. 4, 2007 in U.S. Appl. No. 11/058,096.

Response to Non-Final Office Action mailed Jun. 4, 2007 in U.S. Appl. No. 11/058,096, filed Oct. 4, 2007.

Final Office Action mailed Mar. 18, 2009 in U.S. Appl. No. 11/058,096.

Response to Final Office Action mailed Mar. 18, 2009 in U.S. Appl. No. 11/058,096, filed Jun. 18, 2009.

Final Office Action Mailed Dec. 21, 2007 in U.S. Appl. No. 11/058,096.

Response to Final Office Action mailed Dec. 21, 2007 in U.S. Appl. No. 11/058,096 filed Feb. 21, 2008.

Advisory Action mailed May 21, 2008 in U.S. Appl. No. 11/058,096.

Response to Advisory Action mailed May 21, 2008 in U.S. Appl. No. 11/058,096, filed Jun. 23, 2008.

Notice of Allowance mailed Sep. 22, 2008 in U.S. Appl. No. 11/021,099.

Non-Final Office Action mailed Jun. 11, 2008 in U.S. Appl. No. 11/021,099.

Response to Non-Final Office Action mailed Jun. 11, 2008 in U.S. Appl. No. 11/021,099, filed Jul. 9, 2008.

Non-Final Office Action mailed Jan. 17, 2007 in U.S. Appl. No. 11/021,099.

Response to Non-Final Office Action mailed Jan. 17, 2007 in U.S. Appl. No. 11/021,099, filed Jul. 17, 2007.

Final Office Action mailed Sep. 28, 2007 in U.S. Appl. No. 11/021,099.

Response to Final Office Action mailed Sep. 28, 2007 in U.S. Appl. No. 11/021,099, filed Mar. 21, 2008.

Notice of Allowance mailed Oct. 21, 201 in U.S. Appl. No. 11/035,589.

Response to Final Office Action mailed Jun. 22, 2010 in U.S. Appl. No. 11/035,589, filed Aug. 31, 2010.

Final Office Action mailed Jun. 22, 2010 in U.S. Appl. No. 11/035,589.

Response to Office Action mailed Dec. 28, 2009 in U.S. Appl. No. 11/035,589, filed Mar. 29, 2010.

Office Action mailed Dec. 28, 2009 in U.S. Appl. No. 11/035,589.

Response to Final Office Action mailed Jul. 7, 2009 in U.S. Appl. No.11/035,589, filed Nov. 9, 2009.

Final Office Action mailed Jul. 7, 2009 in U.S. Appl. No. 11/035,589.

Response to Office Action mailed Dec. 2, 2008 in U.S. Appl. No. 11/035,589, filed on Mar. 19, 2009.

Office Action mailed Dec. 2, 2008 in U.S. Appl. No. 11/035,589.

* cited by examiner

My Music List

| Title | Artist | Album | Genre | Length | Sampling |
|---|---|---|---|---|---|
| When It's Over | Sugar Ray | Sugar Ray | Rock | 3:38 | 128 Kbps |
| Every Morning | Sugar Ray | 14:59 | Rock | 3:39 | 128 Kbps |
| Someday | Sugar Ray | 14:59 | Rock | 4:03 | 128 Kbps |
| This Love | Maroon 5 | Songs About . | Rock | 3:26 | 128 Kbps |
| She Will Be ... | Maroon 5 | Songs About . | Rock | 4:17 | 128 Kbps |
| Sunday Morning | Maroon 5 | Songs About . | Rock | 4:06 | 128 Kbps |
| Clarity | John Mayer | Heavier ... | Rock | 4:32 | 128 Kbps |
| Smooth | Santana | Supernatural | Pop | 4:58 | 64 Kbps |

*Fig.1A.*

My Images

| Filename | File Size | Date Created | Color Depth | File Type |
|---|---|---|---|---|
| Vacation_001 | 1,389 Kb | 12/13/04 1:30 pm | 34 bit color | Tiff image |
| Vacation_002 | 1,268 Kb | 12/13/04 2:59 pm | 34 bit color | Tiff image |
| Vacation_007 | 1,272 Kb | 12/15/04 3:09 pm | 34 bit color | Tiff image |
| Vacation_026 | 1,391 Kb | 12/20/04 9:32 am | 34 bit color | Tiff image |
| Amber and Eric | 1,207 Kb | 9/17/03 4:42 pm | 34 bit color | Tiff image |
| Andrew fishing | 843 Kb | 7/15/03 12:34 pm | 24 bit color | JPEG ima. |
| Alex at meet_1 | 669 Kb | 10/17/04 11:30am | 24 bit color | JPEG ima. |
| Alex at meet_2 | 578 Kb | 10/17/04 11:30am | 16 bit grey | PNG ima.. |

*Fig.1B.*

My Bookmarks

| Web Site Name | URL | Last Visited |
|---|---|---|
| Welcome To MSN.com | Http://www.msn.com | 12/29/04 8:30.. |
| Creativity.com Home ... | Http://www.creativity.com | 10/17/04 7:59.. |
| Seattle Times Home Page | Http://www.seattletimes.com | 7/15/04 5:03 ... |
| United States Patent ... | Http://www.uspto.gov | 5/22/04 10:33 . |
| Amazone.com: Welcome | Http://www.amazone.com | 5/18/04 8:22 ... |
| World Sports Network | Http://www.worldsports.net | 1/2/04 9:11am |
| Everysite Search | Gopher://everysearch.gph | 12/28/03 7:37. |
| Alan Parson's Project ... | Hthts://www.app-fans.com | 12/15/03 4:24. |

*Fig.1C.*

My List Of Music, Images, and URL Bookmarks

| Type ID | Title | Artist | Filename | File Size | Web Site Name | File Type |
|---|---|---|---|---|---|---|
| Song | When It's Over | Sugar Ray | When It's Over | 3,374 Kb | | Windows Media |
| Song | Every Morning | Sugar Ray | Every Morning | 3,393 Kb | | Windows Media |
| Song | Someday | Sugar Ray | Someday | 3,756 Kb | | Windows Media |
| Song | This Love | Maroon 5 | This Love | 3,178 Kb | | MP3 |
| Song | She Will Be ... | Maroon 5 | She Will Be ... | 3,951 Kb | | MP3 |
| Song | Sunday Morning | Maroon 5 | Sunday ... | 3,787 Kb | | Windows Media |
| Song | Clarity | John Mayer | Clarity | 4,182 Kb | | Windows Media |
| Song | Smooth | Santana | Smooth | 4,596 Kb | | Windows Media |
| Song | Love Shack | B 52s | Love Shack | 4,669 Kb | | MP3 |
| Image | | | Vacation_001 | 1,389 Kb | | Tiff image |
| Image | | | Vacation_002 | 1,268 Kb | | Tiff image |
| Image | | | Vacation_007 | 1,272 Kb | | Tiff image |
| Image | | | Vacation_026 | 1,391 Kb | | Tiff image |
| Image | | | Amber and Eric | 1,207 Kb | | Tiff image |
| Image | | | Andrew fishing | 843 Kb | | JPEG image |
| Image | | | Alex at meet_1 | 669 Kb | | JPEG image |
| Image | | | Alex at meet_2 | 578 Kb | | PNG image |
| URL | | | WelcomeMSN | 1 Kb | Welcome To MSN.com | URL Link |
| URL | | | CreativeLink | 1 Kb | Creativity.com Home ... | URL Link |
| URL | | | SeattleTimes | 1 Kb | Seattle Times Home ... | URL Link |
| URL | | | USPTOLink | 1 Kb | United States Patent ... | URL Link |
| URL | | | AmazoneFront | 1 Kb | Amazone.com: Welcome | URL Link |

*Fig.2.*

HIERARCHICAL MANAGEMENT OF OBJECT SCHEMA AND BEHAVIOR

CROSS-REFERENCE TO RELATED APPLICATION

This application is a continuation in part of U.S. application Ser. No. 11/058,096, filed Feb. 14, 2005, which application issued on Jan. 26, 2010, as U.S. Pat. No. 7,653,653, entitled "DYNAMICALLY CONFIGURABLE LISTS FOR INCLUDING MULTIPLE CONTENT TYPES," the filing date of which is hereby claimed under 35 U.S.C. §120.

BACKGROUND

Almost everyone that uses a computer, or some computing device, is familiar with a ubiquitous management tool called the list. Indeed, computer users maintain lists of e-mail contacts, URL bookmarks, music, digitized images, computer files, and the like, to name just a few. Using a list, a user can organize related items in useful ways. For example, a user can search or sort within a list of computer files for text, or the user can specify the order that certain songs will be played. With a list, a user can display, edit, and manipulate list items.

Unfortunately, as computer users are aware, lists are directed to homogenous items. In other words, while lists manage multiple list items, they manage multiple list items that are of a single type. For example, while a computer user may have lists of URL bookmarks, phone numbers, e-mail addresses, music, images, computer files, the computer user must manage each list separately, e.g., a list of phone numbers, a list of email addresses, a list of music, etc. Each list manages information of a single type.

As those skilled in the art will appreciate, each type of list item typically has various properties, many of which are unique to the type. In fact, in general, list items are included in a list because they share common properties, even though the actual content of an item in an individual list is different. For example, FIGS. 1A, 1B, and 1C are pictorial diagrams illustrating typical displays of lists that may be found on any given computing system. In particular, FIG. 1A illustrates a music list 100 of music/songs available on a computing device. As is common with the display of list times (items?), music list 100 is shown in a tabular format, with columns representing the various properties of each item type. For example, with reference to FIG. 1A, the list of music 100 includes at least six properties, including Title 102, Artist 104, Album 106, Genre 108, Length 110, and Sampling Rate 112. Each row in the list represents an item in the list. For example, the row included in box 114 represents a single song, and displays the title of the song, its artist, the album on which it is found, as well as the song's genre, length, and sampling rate.

FIG. 1B illustrates an image list 130 of images/pictures available on the computer. Images in the image list 130 all have common properties including Filename 132, File Size 134, Date Created 136, Color Depth 138, File Type 138, and the like. Similarly, bookmarks in the bookmark list 160 of FIG. 1C each have common properties, including Web Site Name 162, URL 164, Date Last Visited 166, and the like.

Modern software is used to implement a wide range of solutions to various problems. Due to the complexity of modern applications, development of software solutions for these applications is costly, time-consuming, and error-prone. Consequently, the reuse of software modules is desirable. In many respects, the reuse of software is similar to the reuse of hardware, that is, electronic components and chips where a well-defined component, such as a logic chip or a communication interface chip, is designed once and used in many applications in which the same functionality provided by the component is required.

In recent years, software reuse has become a major area of concern and research. One of the techniques used to enable software reuse is the use of software objects. As known to those skilled in the art, a software object is a software entity that encapsulates data and functionality in one logical component. Access to the object's data and functions is controlled by well-defined interfaces, thereby enabling a modular software system with reusable components.

Reusability of software components has several requirements, including ease of creation, ease of reuse, and ease of update of the software component. The type of an object includes a schema as well as information about how an object must behave. For example, a task object (i.e., an object representing a task) may have data fields which define who is assigned to the task and when the task is to be completed. Additionally, the task may have certain desired behaviors as well. For example, sending a daily reminder to the task owner and archiving itself when the task is completed.

The reuse of an object must be easy for a user who wants to use such object in a new application. The updating of an object must also be easy. Once an object is designed and deployed, many other users may elect to use the object in their applications for the functionalities that the object provides. However, when an object type is modified at the source, it is desirable that the changes to the object be propagated to the users of that object, especially those who desire to have the changes. In real organizations, types of objects are living entities in that the objects are constantly being changed and enhanced to address new demands and needs. For example, in a corporate environment, a task object which sends periodic reminder e-mails may be modified to additionally log the reminder e-mails for statistical analysis. A robust system must provide a method of making such change in one location and subsequently propagate the change to all other locations where that object type is used and the change is desired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the invention, a method of reusing an object type in a computing environment is presented, the method comprising accepting modifications made to an object type at a source data site in a first computing environment storing the object type, the object type comprising schema and behaviors, wherein the modifications are made to at least one of the schema or behaviors of the object type at the source data site; applying the modifications made to the at least one of the schema or behaviors of the object type at the source data site to an object type schema and behavior at a destination data site in a second computing environment, the object type at the destination data site corresponding to the object type at the source data site; and applying the modifications to an existing object created based on the object type at the destination data site in the second computing environment.

In another aspect of the invention, a method of managing object type schema and behavior is presented, the method comprising accepting modifications made to at least one of the object type schema or behavior at a source data site in a first computing environment storing the object type, the object type comprising schema and behaviors; selecting one of an option of propagating and not propagating the modifications to another object type schema and behavior at a destination data site in a second computing environment, the other object type at the destination data site corresponding to the object type at the source data site; applying the modifications to the other object type schema and behavior at the destination data site; and applying the modifications to an existing object created based on the other object type at the destination data site in the second computing environment.

In another aspect of the invention, a computer-readable medium containing computer-executable code for managing object type schema and behavior by accepting modifications made to at least one of the object type schema or behavior at a source data site in a first computing environment storing the object type schema is presented, the object type comprising schema and behaviors; selecting one of an option of propagating and not propagating the modifications to another object type schema and behavior at a destination data site in a second computing environment, the other object type at the destination data site corresponding to the object type at the source data site; applying the modifications to the other object type schema and behavior at the destination data site; and applying the modifications to an existing object created based on the other object type at the destination data site in the second computing environment.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A, 1B, and 1C are pictorial diagrams illustrating typical displays of lists that may be found on a computing system;

FIG. 2 is a pictorial diagram illustrating the display of an exemplary list formed in accordance with the present invention;

DETAILED DESCRIPTION

Figure 3:
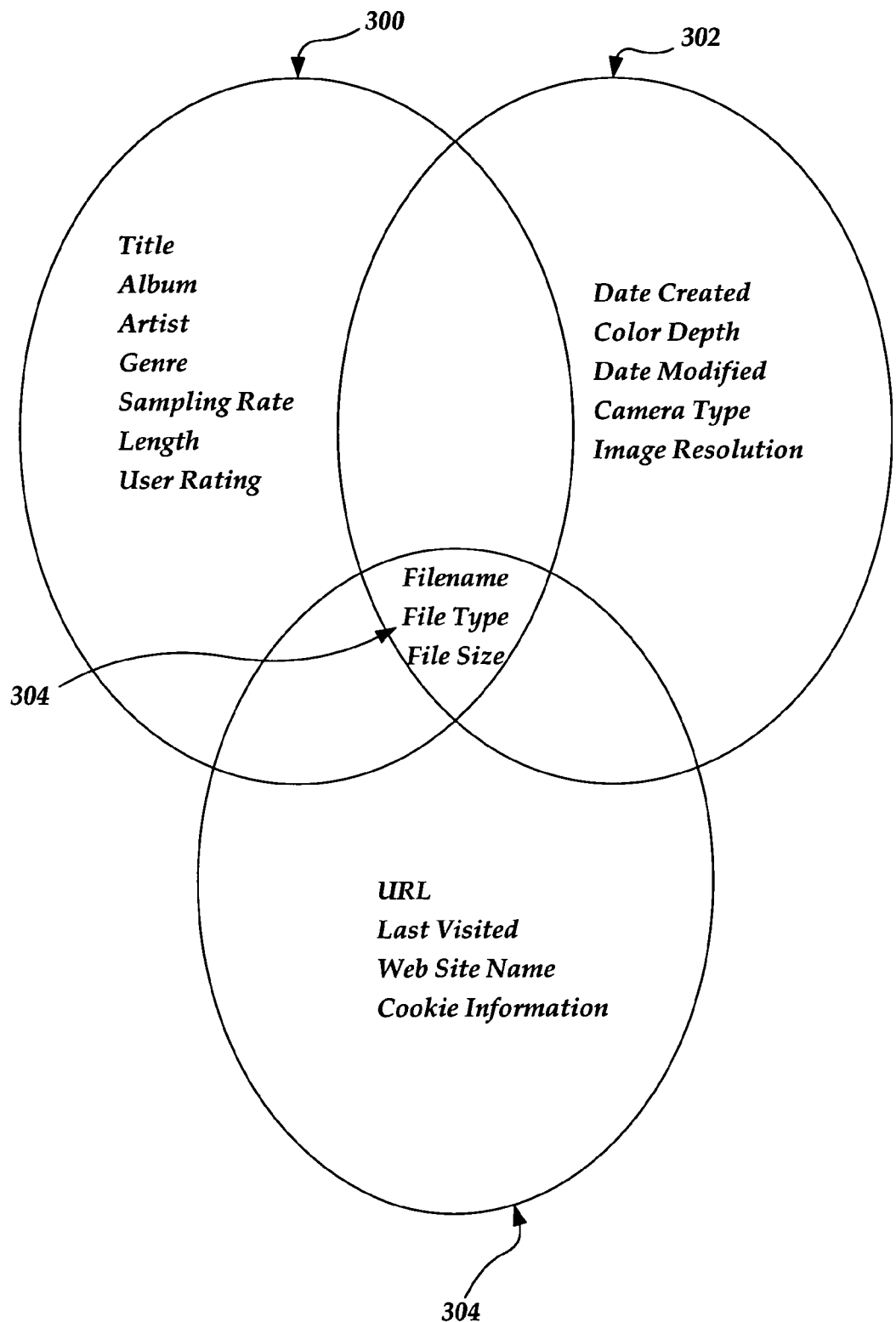
FIG. 3 is a pictorial diagram for illustrating the union of element attributes.

While illustrative embodiments have been illustrated and described, it will be appreciated that various changes can be made therein without departing from the spirit and scope of the invention.

A system and a method for propagating changes to software object types to users of the software object types are described. While the system and the method are suited for propagating changes in object types and schemas, such as configurable lists, from parent Web sites to child Web sites in a hierarchical Web server environment, the system and method may also find use in other hierarchical software environments where software objects are used. Thus, it is to be understood that the present invention should not be construed as limited in application to the exemplary embodiments described herein, and such exemplary embodiments should not be construed as limiting.

According to aspects of the present invention, a dynamically configurable list capable of including multiple list types is presented. In order to include disparate list types within a single list, for each list element in a list, a corresponding element type is also included. In one embodiment, the element type is a unique value corresponding to a particular list element.

In various embodiments, a list may include the element type as a list attribute. Alternatively, the element type may be a value simply associated with the list element. Similarly, the element type may be displayed to the user as a list type property. FIG. 2 is a pictorial diagram illustrating an exemplary dynamically configurable list capable of including disparate list element types.

FIG. 2 is a pictorial diagram illustrating the display of an exemplary list 200 formed in accordance with the present invention. The exemplary list 200 includes list elements of three types: music, images, and URL Bookmarks. As indicated above, each element in the list 200, such as element 202, is associated with an element type. As mentioned above and illustrated in FIG. 2, element types may be included as part of the list 200 as an element property, such as hidden element property type 204. It should be noted that while the element types shown in the type column 204 are displayed as text strings, it is illustrative only and should not be construed as limiting the present invention. As an example, if the type is displayed, it is only a textual representation of the underlying unique type identifier.

Those skilled in the art will appreciate that, in the prior art, lists have relied upon the fact that elements in the list were all of the same type, and thus, all shared type attributes common to that type. Thus, in their display, each element had a value for each type attribute. In contrast, the present invention combines the attributes of all included element types into its list of attributes. Clearly, all list elements may not have values for each attribute. For example, as shown in FIG. 2, which illustrates a list that combines music, images, and URL Bookmarks, not all list elements include values for various attributes, including Title 206, Artist 208, and Web Site Name 210. In displaying a multi-type list, such as list 200, where an individual element has a value corresponding to an attribute, such as with attributes Filename 212, File Size 214, and File Type 216, a value is typically displayed.

According to aspects of the present invention, when adding an element type to a list, the list performs a union of type attributes, adding the type attributes of the newly added element type to those already existing in the list. For example, FIG. 3 is a pictorial diagram that illustrates the union of element attributes. Each oval identifies type attributes associated with the list type. In particular, oval 300 identifies exemplary music attributes, including, but not limited to, Title, Album, Artist, Genre, Sampling Rate, Length, User Rating, File Type, File Size, and Filename. Oval 302 identifies exemplary image attributes, including, but not limited to, Creation Date, Modification Date, Color Depth, Camera Type, Image Resolution, File Type, File Size, and Filename. Similarly, oval 304 identifies exemplary URL Bookmark attributes, including, but not limited to, URL, Web Site Name, Date Last Visited, Cookie Information, File Type, File Size, and Filename.

As can be seen from this diagram, while there are many type attributes that are not shared among the types, there are some, i.e., those attributes found in the intersection 306 of the ovals, that are shared among the types. It is for these type attributes that a list may display values of all types of list elements. Thus, if the list already includes music elements, and was then expanded to include image elements, image elements Creation Date, Modification Date, Color Depth, Camera Type, and Image Resolution would be added to the list, while File Type, File Size, and Filename would not as they already exist within the list.

According to one embodiment of the present invention, a user must first associate an element type with an existing list, prior to adding elements of that type to the list. However, in an alternative embodiment, an element type may be added to the list when an element of that type is first added.

Figure 4:
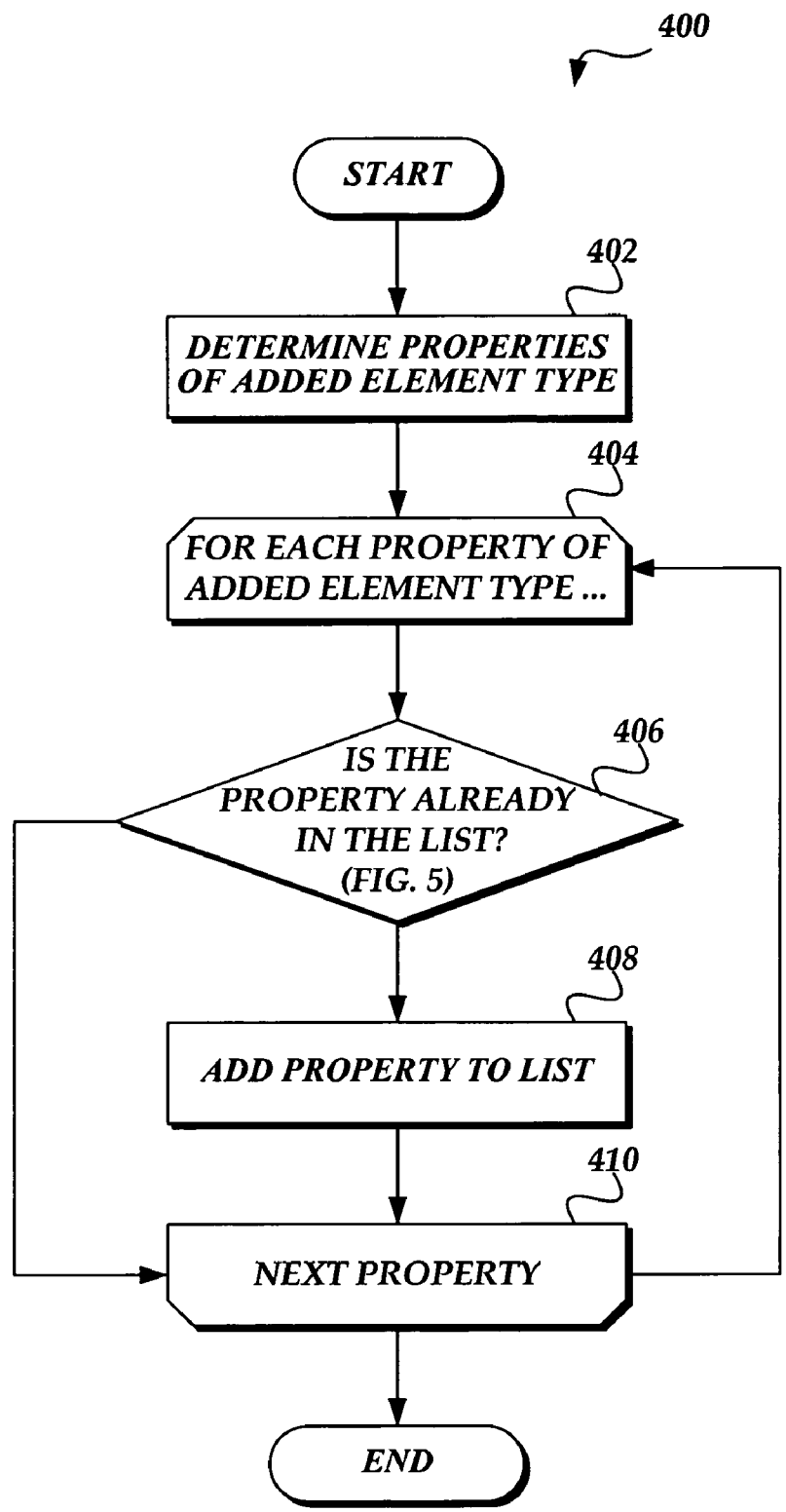
FIG. 4 is a flow diagram implemented in the list management system, illustrating an exemplary routine for adding a new element type to an existing list.

In regard to adding new element types to an existing list, FIG. 4 is a flow diagram implemented in the list management system, illustrating an exemplary routine 400 for adding the new element type to the existing list. Beginning at block 402, the properties of the new element type are determined. While not shown, in an alternative embodiment, those skilled in the art will appreciate that rather than determining all of the element type properties at the beginning of the exemplary routine 400, the element type properties may be determined during the processing of the routine, i.e., during the subsequent "for loop" where each property is examined.

Figure 5:
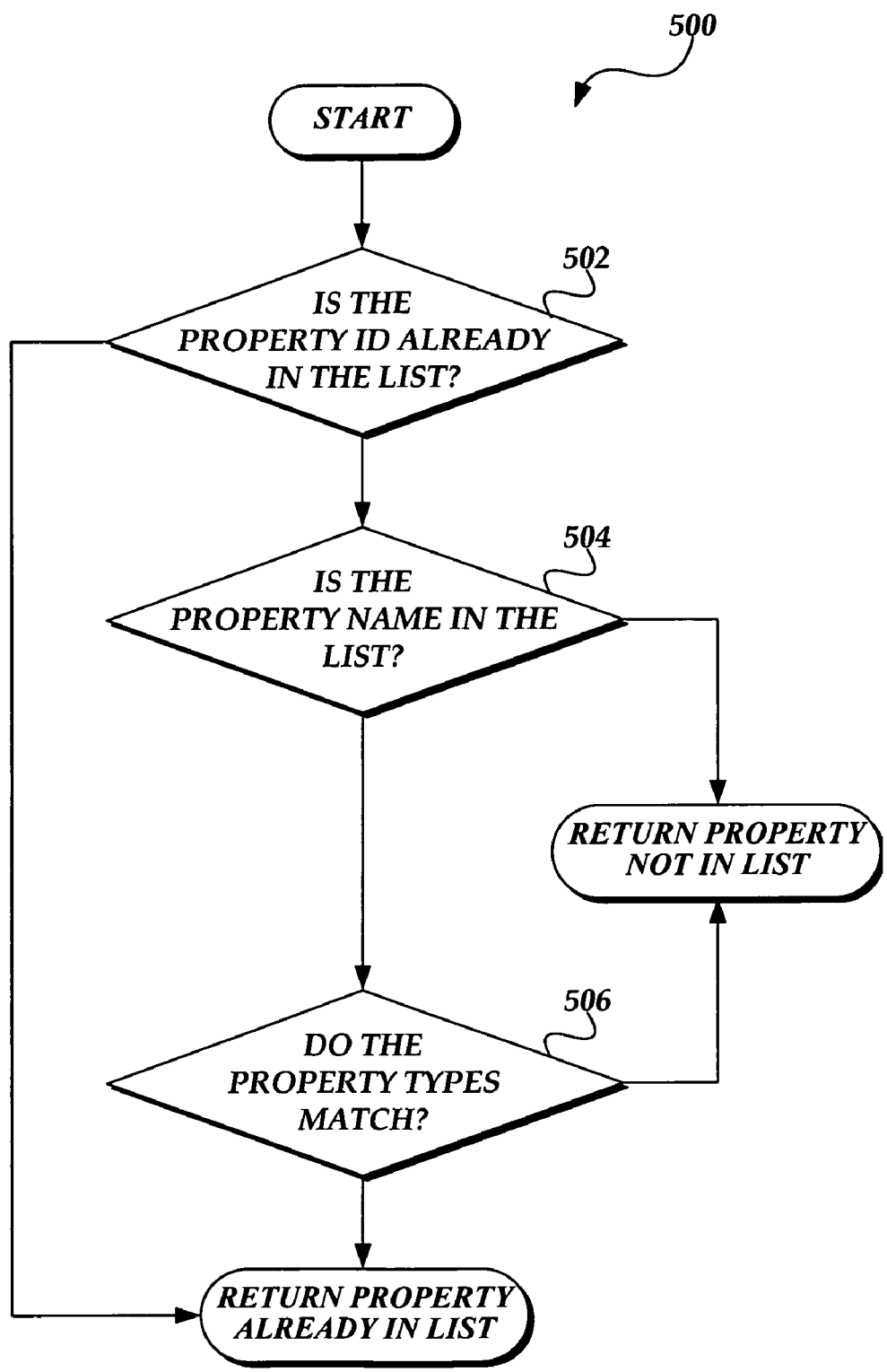
FIG. 5 is a flow diagram illustrating an exemplary subroutine for determining whether a potentially new property already exists in an existing list.

At looping block 404, the above-mentioned "for loop" is commenced to iterate through each property of the new element type. As such, the first property of the element type is selected. At decision block 406, a determination is made as to whether the selected property already exists within the list. Determining whether the selected property already exists within the list is described in greater detail below in regard to FIG. 5.

If the property does not already exist within the list, at block 408, the property is added to the list, i.e., the list's properties are expanded for each element to include this property. Of course, as discussed earlier, not all list elements will have a value corresponding to this property. After adding the property to the list or, alternatively, if the property already exists within the list, the routine 400 proceeds to loop block 410.

At loop block 410, the end of the "for loop" is reached. Thus, as those skilled in the art will appreciate, in accordance with this type of looping structure, the routine 400 either selects another property if there are more to select, thereby returning to the start of the "for loop" block 406, or continues execution outside of the loop. In this case, continuing beyond the "for loop" means that the routine 400 has completed its purpose, and the exemplary routine terminates.

In regard to determining whether a potentially new (selected) property already exists in the list, as mentioned above, FIG. 5 is a flow diagram illustrating an exemplary subroutine 500 for determining whether the potentially new property already exists in the list. Beginning at block 502, a determination is made regarding whether the selected property is already in the list according to the selected property's unique identifier, i.e., its type identifier described above with reference to FIG. 2. If there is a match between the selected property's unique identifier and a property already existing within the list's system, the exemplary subroutine 500 returns an affirmation that the selected property already exists in the list.

Even when there is not an exact match with the selected property's identifier, there may be instances when the selected property and an existing property are so similar that they should be considered a match. Unfortunately, while some element type properties may superficially appear to be the same, they are not. To illustrate, assume that the image types described above included an attribute called "Album." Superficially, it may appear that the "Album" property for the music element type is sufficiently the same as the "Album" property for the image element type and could/should be considered a match. However, if the image element property "Album" corresponds to a system command executing a computer program that maintains image albums, it could be confusing to a user to display a music element "Album" property in the same column as an image element "Album" property. Accordingly, when deciding on whether an attribute of a list type already exists among the list attributes, an additional determination must occur (when the property type identifier does not match). Thus, at decision block 504, a determination is made as to whether the selected property's name matches to a property already existing in the list. If there is no match, the routine 500 returns without including the selected properties in the list.

If the selected property's name matches a property name already existing in the list, at decision block 506, an additional determination is made as to whether the selected property's type matches the potentially matching property already existing in the list. In other words, if the names match, an additional determination is made to ensure that the type of property is the same before concluding that the property is already in the list. Types of properties may include, but are certainly not limited to, text strings, numerical values, enumerated types, floating point values, and the like. If the property types match, the exemplary subroutine 500 returns an affirmative indication that the selected property already exists in the list. Alternatively, if the property types do not match, the exemplary subroutine 500 returns a negative indication that the selected property does not exist in the list.

As can be seen from the description above, in order for a list to effectively manage elements of multiple types, the list must be able to identify the element's properties and determine whether they exist within its management system. According to aspects of the present invention, each element type property is associated with a unique identifier. Element type properties also typically include property names and value properties, i.e., whether the corresponding value is a text string, a character, a numeric value, or the like. Property information, such as property name and value type, can be maintained and modified by a user when defining an element type. Typically, however, the element type identifier is generated and maintained by the list system.

Figure 6:
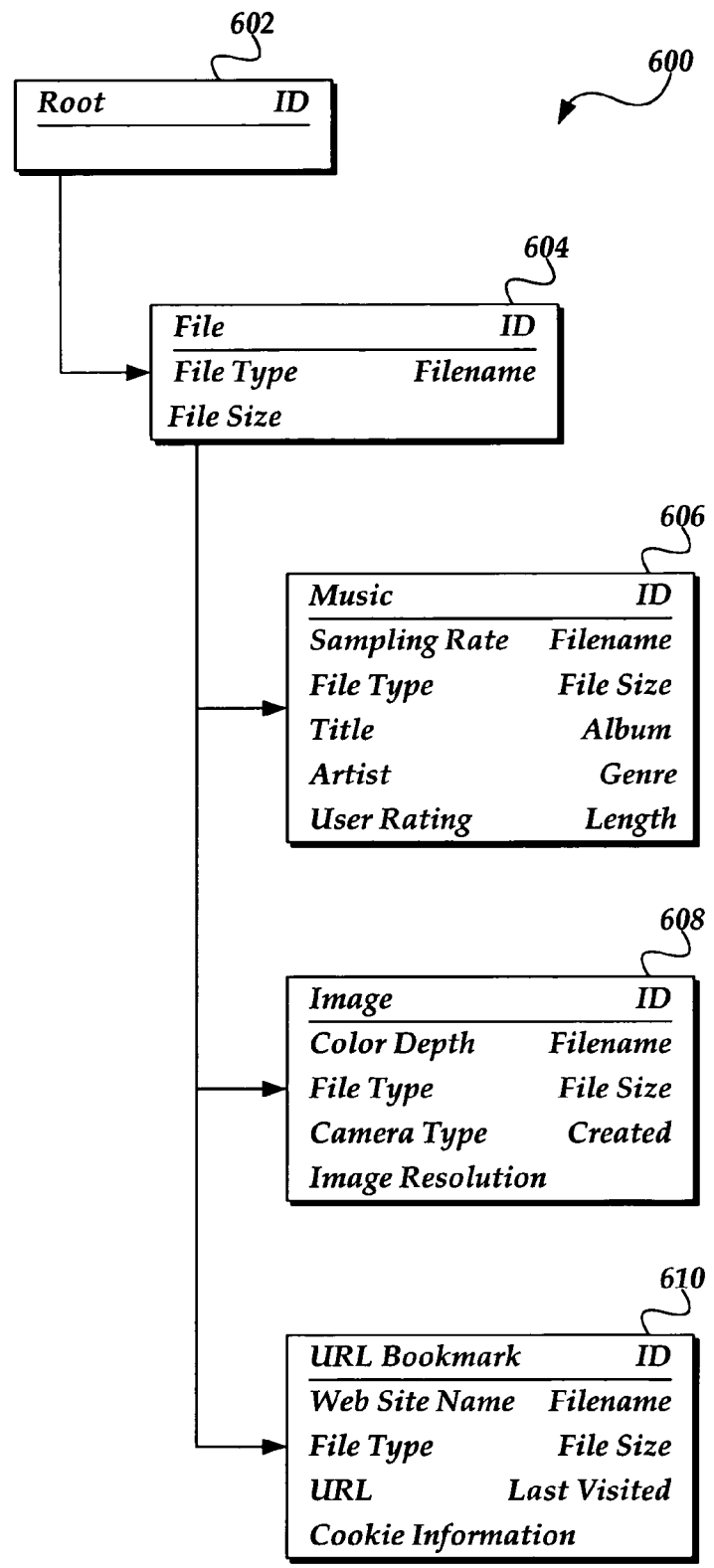
FIG. 6 is a pictorial diagram illustrating a hierarchical organization of list element types.

According to one embodiment of the present invention, the list management system utilizes a hierarchical organization to maintain list element types, as well as properties for each list element type. FIG. 6 is a pictorial diagram illustrating a hierarchical organization 600 of list element types. At the top of the hierarchical organization is a root type 602. Typically, the root element type is a read-only type and is used to create child element types. As shown in FIG. 6, the root type includes a type identifier (ID). As can be seen, the root type does not necessarily have any properties associated with it. This root type serves as a template for child types. However, unlike the inheritance concept found in most object-oriented programming languages, the inheritance of parent to child type is not strictly enforced.

Child element types are created/established based on the parent type, i.e., including the same properties or attributes as the parent. Thus, the file type 604, being a child of the root type 602, initially includes all properties of the parent (which, in this case, does not have properties). Additionally, as can be seen, file type properties have been added, namely File Type, Filename, and File Size.

From the file element type 604 are three children element types, namely, a Music type 606, an Image type 608, and a URL Bookmark type 610. As can be seen, each child type is initially created with the properties and attributes of the parent type, and has additional properties added. While this diagram illustrates only a few levels of "inheritance," it should be appreciated that each defined type may be the parent of yet another child element type.

As mentioned above, according to aspects of the present invention, inheritance of parent to child type is not strictly enforced. What this means is that while a child element type is initially created with all the properties/attributes of the parent element type, a user is free to configure the child element type in whatever manner that seems suitable. For example, a user may wish to remove the inherited property "File Type" from the URL Bookmark element type 610. As those skilled in the art will then recognize, this is very much unlike inheritance from object-oriented programming. More particularly, in object-oriented programming, one can override the functionality of an inherited property or attribute but cannot remove that attribute. In contrast, the present invention may, in most instances, permit one to remove an inherited property. Clearly, this is a substantial departure from the typical inheritance paradigm associated with object-oriented programming.

In order to enforce inheritance, such as found in object-oriented programming, according to the present invention, properties in each element type may be locked. By locking a property, child element types that are created after that property is locked must include that property. In this manner, a user cannot remove or modify the property without unlocking that property at the parent element type where it was locked. However, in further contrast to the object-oriented paradigm, locking a property alone does not affect currently existing child element types. In other words, if a user were to configure the File type 604 such that the property File Type were locked, and assuming that the URL Bookmark element type 610 were already existing, that user would be able to delete the File Type property because it was existing prior to that property being locked.

In order to ensure that when properties are locked the modifications are propagated down the hierarchy chain, a push instruction must be given by the user. A push instruction forces the existing children to accept the pushed modifications. It should be noted that a push instruction could be utilized without locking a particular property. For example (not shown), if a user added a Foo property to element File type 604, the user could then issue a push instruction that would propagate the Foo property throughout the inheritance chains to the children element types. However, without first locking that Foo property in the parent definition, a user could subsequently remove that Foo property from any particular child element type.

The dynamically configurable list described above is one of many object types that may be propagated from a source data site where the object type is defined to a destination data site where the object type is used. The propagation of object types is discussed below in the context of hierarchical data sites.

Figure 7A:
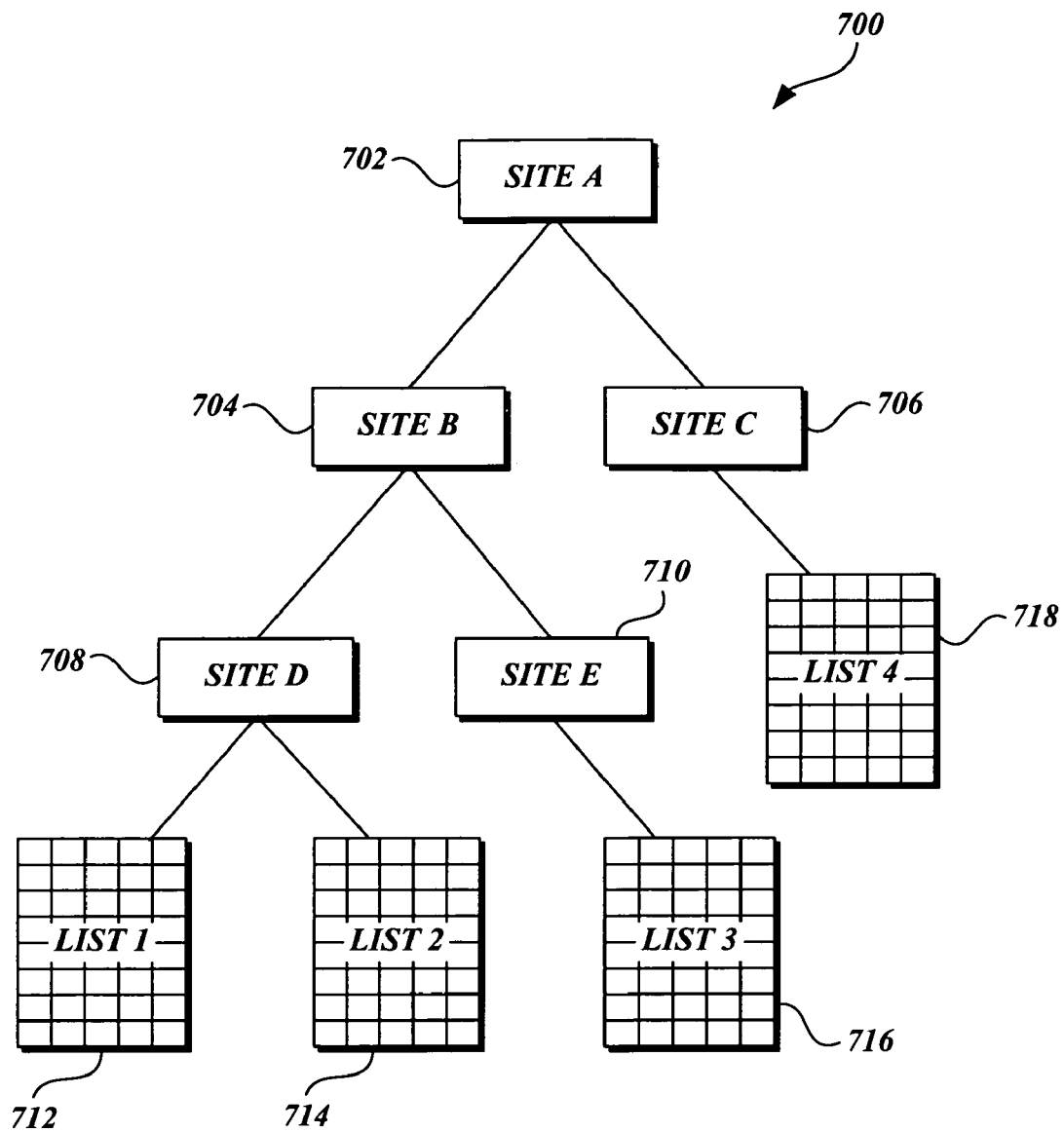
FIG. 7A is a pictorial diagram of an exemplary hierarchy of data sites.

FIG. 7A is a pictorial diagram of an exemplary hierarchy of data sites 700. In the exemplary hierarchy of data sites 700, site 702 is a root Web site. Site 702 may include multiple other Web sites like site 704 and site 706. Site 704 may include other sites, such as site 708 and site 710. Site 706 may include a list 718 while site 708 includes lists 712 and 714 and site 710 includes list 716. In one embodiment, the hierarchy of data sites 700 may be a hierarchy of Web servers, such as a Microsoft SharePoint Server®, where site 702 may be a top level site, sites 704 and 706 may be other sites contained in site 702, sites 708 and 710 may be yet other sites contained within sites 704 and 706, and lists 712-718 may be Web pages that display lists of items. Lists generally do not contain sites or other lists. It is generally known in the art that a virtual server is a virtual computer implemented in software running on a hardware computer, such as a Web server, also known as an HTTP (Hyper Text Transfer Protocol) server.

Figure 7B:
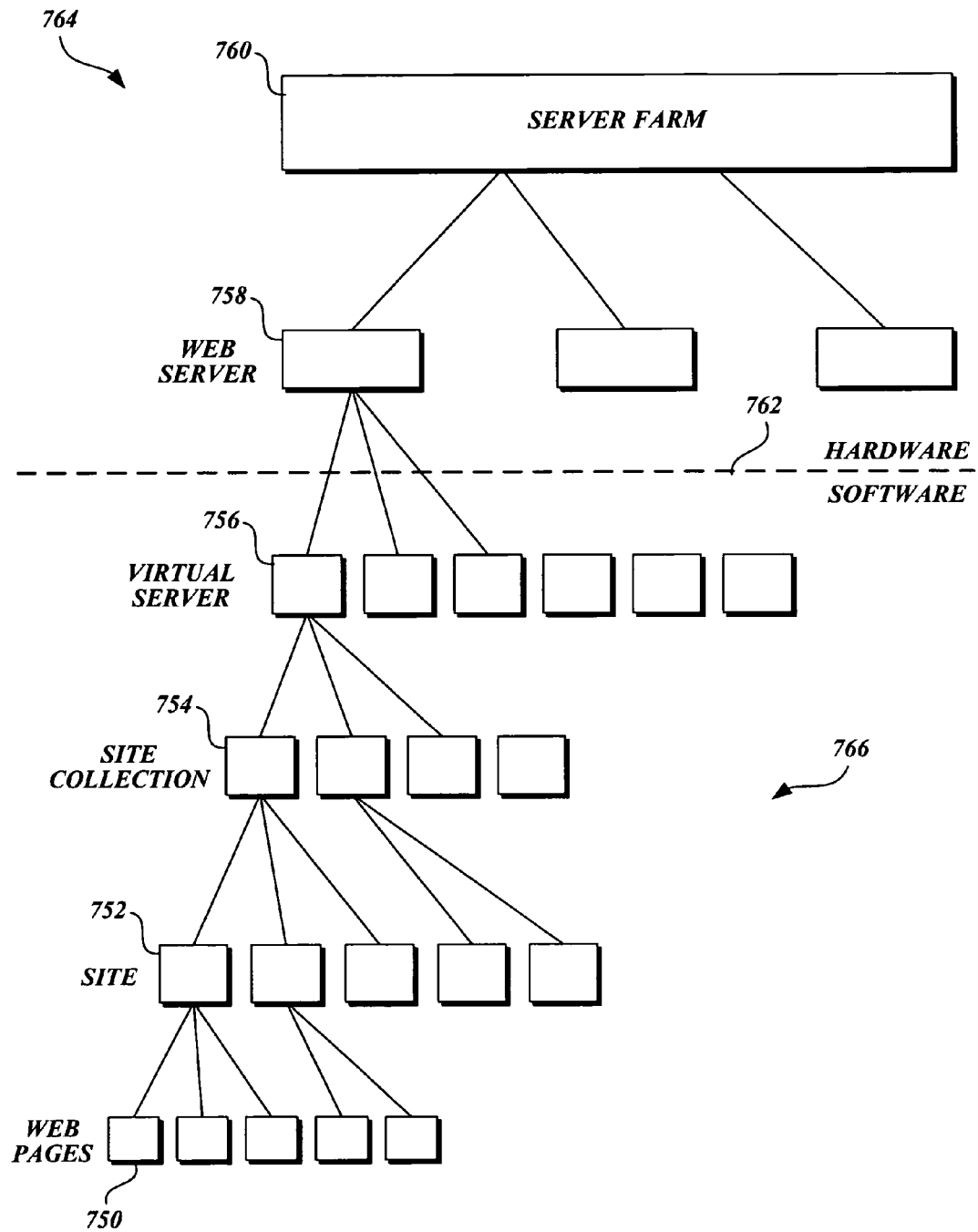
FIG. 7B is a pictorial diagram of an exemplary hierarchy of Web sites.

FIG. 7B is a pictorial diagram of an exemplary hierarchy of Web sites. In one implementation, several Web pages 750, which have related content and are interconnected by hyperlinks, are grouped in a site 752. Each site 752 may contain multiple levels of other sites 752. Several sites 752 are further grouped into a site collection 754 and have the same owner and share administrative settings. Several site collections 754 are grouped together and served by a virtual server 756. Each virtual server 756 has independent access to hardware resources, such as input and peripherals devices. Each virtual server 756 has a separate domain name and IP (Internet Protocol) address. Several virtual servers 756 are hosted and can run on one hardware computer, such as a Web server 758. Several Web servers 758 are grouped together in a server farm 760. A server farm 760 is a centralized group of network servers, which is maintained by one organization, and provides network load balancing, scalability, and fault tolerance. Individual servers 758 are connected together in a server farm 760 such that the server farm 760 appears to an end-user as a single computer or Web server 758. In one embodiment, the component collections 764 above the dotted line 762 are implemented in hardware, while the component collections 766 below the dotted line 762 are implemented in software. In one implementation, the hierarchy of data sites shown in FIGS. 7A and 7B may be a logical hierarchy, not corresponding to the proximity and structural relationships of the data sites.

Types of objects in a hierarchical data environment, such as the exemplary hierarchy of data sites 700 discussed above, may be defined using templates. In one embodiment, an extensible XML (extensible markup language) format is used to define the data structures included in object types. Object types can exist at each of two different levels including site level and list level. Object types that reside at site level must have parent object types and may have child object types. Object types that reside at list level must have parent object types and cannot have child objects. Having parent objects and child objects constitutes an object type hierarchy that is helpful for promoting object reuse by reusing similar aspects of an object type in multiple places, such as parent objects and child objects. For example, several types of objects representing several types of tasks may share common aspects that all tasks have. For instance, a Workflow Task, a Development Task, and a Test Task may all have a "Task Owner" property and a "Task Due Date" property. A generic parent object type, such as "Task," may be defined with all the common properties of all tasks and the more specific child object types, such as the Workflow Task and the Development Task, may be derived from the generic parent object type Task. Thus, the common properties of all tasks, such as the Task Owner property, may be reused instead of separately redefining the same property for each type of task. In the art, the relationship described above with respect to shared properties between parent and child object types is referred to as inheritance. The child object type is said to inherit the properties of the parent object type.

In one embodiment, when a new child object type is created, the child object type is an exact duplicate of the parent object type from which the child object type was derived. The child object type may be customized by adding more properties or changing existing properties after the creation of the child object type. In one embodiment, the child object type may be customized programmatically by using an object model and the functional interfaces provided by the object model. In another embodiment, the child object type may be customized using a graphical user interface ("GUI").

Most Web pages display lists of items in one form or another. For example, a Web page may display a list of restaurants, a list of links to other Web pages, a list of documents, or a list of people. The lists may include multiple columns, like a table, where multiple rows are included in the list, each row having a number of columns. In one embodiment, a column in a list is constructed from an object type and represents a certain type of information in the list. For example, a list for the display of names and phone numbers may have two columns, one for name and one for phone number. The name column may have properties, such as a Status indicating whether this column is optional or required. As discussed above, an object type may reside at site level or list level. A site column is a column type that resides at the site level. Similarly, a list column is a column type that resides at the list level. A collection of column types constitutes a content type. In a fashion similar to columns, a site content type is a content type that resides at the site level and a list content type is a content type that resides at the list level. In one embodiment, the data included in site content types and the site column types are defined using XML schema. The data included in list content types and the list column types are created by applying the XML schema from the site content types and site column types, respectively.

Figure 8:
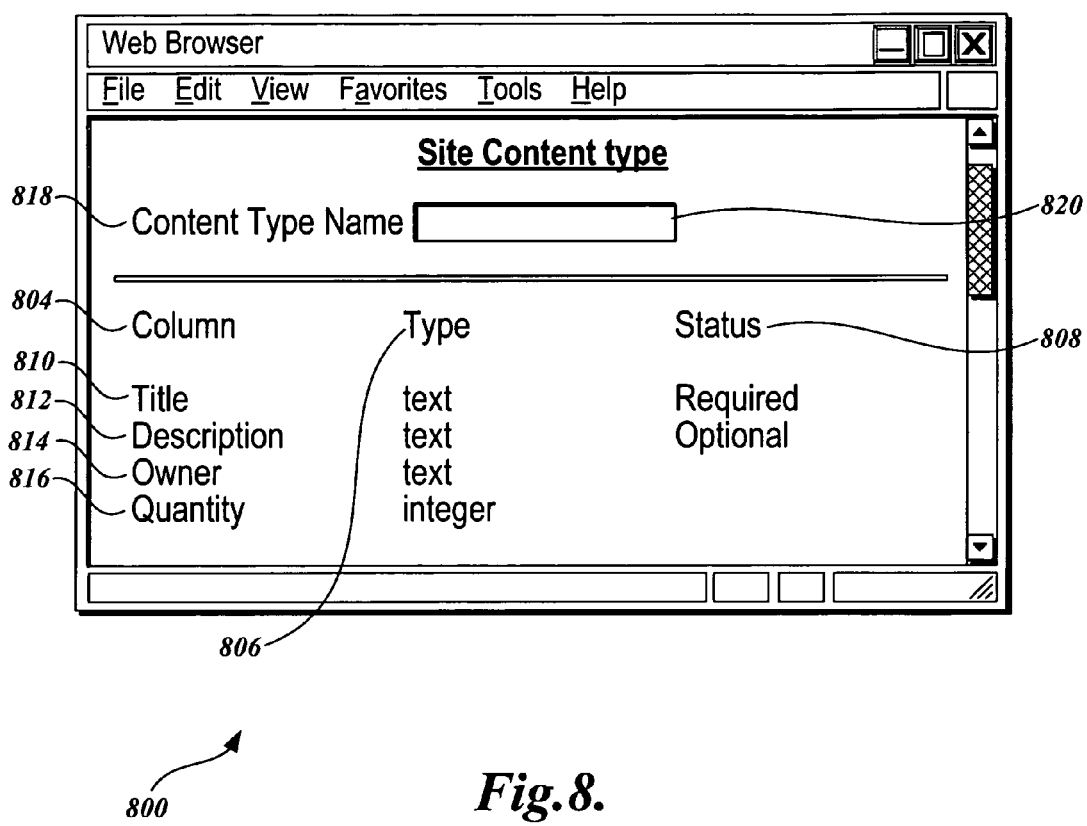
FIG. 8 is a pictorial diagram of an exemplary user interface for managing a site content type.

FIG. 8 is a pictorial diagram of an exemplary user interface 800 for managing a site content type. Using the exemplary user interface 800, a site content type is defined by selecting columns 804 from a list of available columns, for example, a Title column 810, a Description column 812, an Owner column 814, and a Quantity column 816. The listed columns may have properties, such as Type 806 indicating the type of data included in the column, and Status 808 indicating whether the column is optional or required. Those skilled in the art will appreciate that FIG. 8 is a simplified user interface presented for the purpose of illustrating the basic method for defining a site content type and that many more content type properties may be presented in a professional user interface. A site content type defined in the manner described above, constitutes a parent object type, which may be used to define child object types that are copies of the parent object type. Such child object types may be customized for each site, adding new properties to the existing ones. As discussed above, a list may also include a child object type derived in this manner from a parent object type. Such child object types at list level is the list content type and generally includes data for presentation to an end-user. Different sites and lists may have different content types, which content types were based on the same parent site content type, and which were customized for the different sites and lists.

Figure 9:
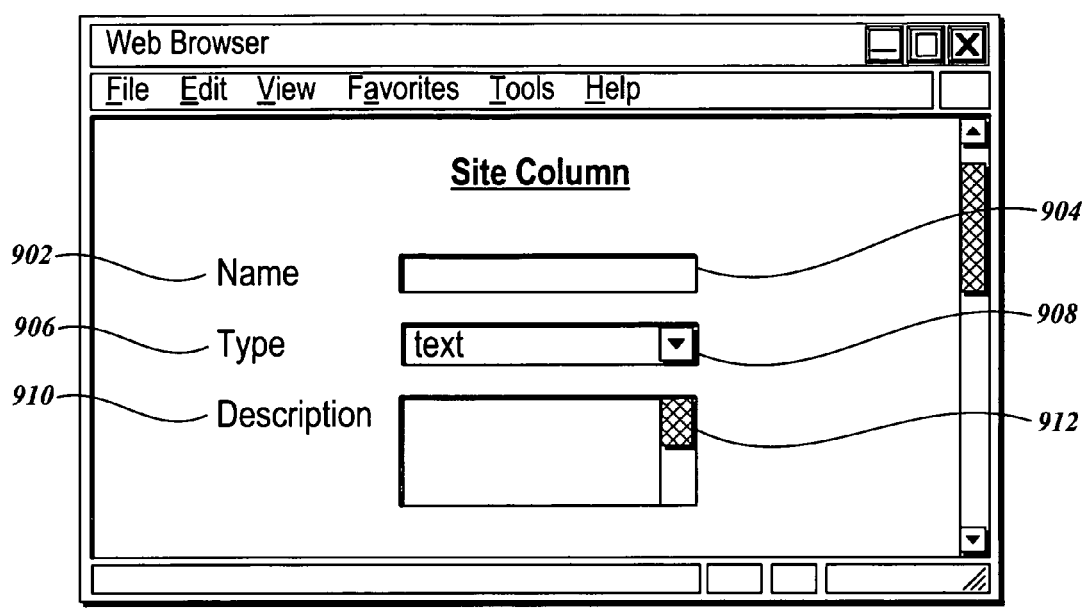
FIG. 9 is a pictorial diagram of an exemplary user interface for managing a site column.

FIG. 9 is a pictorial diagram of an exemplary user interface 900 for managing a site column. Using the exemplary user interface 900, a site column type is defined by selecting various properties of the column from the choices provided by the user interface 900. For example, a column may be defined by writing a Name 902 in a text box 904, selecting a Type 906 of data content for the column, such as "Text" or "Number," from a selection list 908, and entering a Description 910 in the multi-line text box 912. Those skilled in the art will appreciate that FIG. 9 is a simplified user interface presented for the purpose of illustrating the basic method for defining a site column type and that many more column type properties may be presented in a professional user interface. Each site column type defined in the manner described above may be included in many site content types as a constituent component, promoting the reuse of software objects. Similar to list content types, list column types are used to present data to an end-user by being included in a list content type at list level. Different sites and lists may have different column types, as a constituent part of a content type at the different sites and lists, which column types were based on the same parent site column type and which were customized for the different sites and lists.

Figure 10:
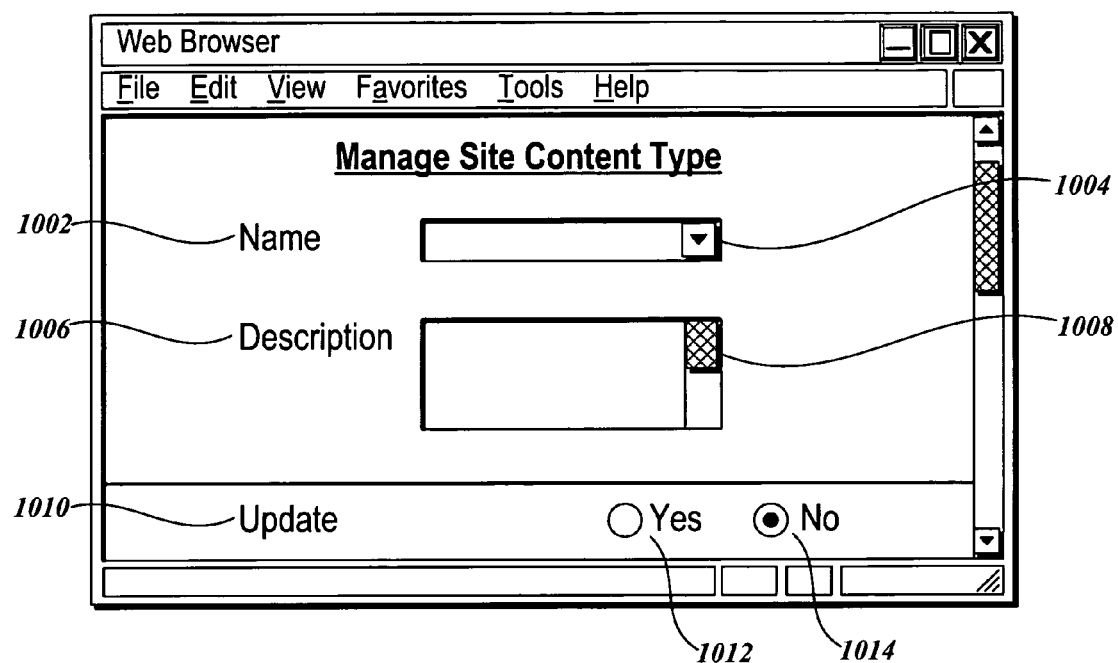
FIG. 10 is a pictorial diagram of an exemplary user interface for managing site content type update.

When a parent object type, such as site content type or site column type, is modified, the child object types that were derived from the parent object type may need to be updated accordingly. An environment with a hierarchy of data sites 700 may include hundreds or thousands of sites, such as sites 704 and 706. Such sites 704 and 706 may include child object types, such as site and list content types and site and list column types, which are based on common parent object types. Updating such child object types according to the changes made to their respective parent object types is error-prone and tedious at best, and all but impossible in most cases. FIG. 10 is a pictorial diagram of an exemplary user interface 1000 for managing site content type update. Content type name 1002 provides an identifier for a site content type displayed in a pick-list 1004. A description 1006 of the site content type is displayed in a multi-line text box 1008. An Update section 1010 is used to indicate whether to propagate the changes made in the parent object type, that is, the site content type, to child object types which were derived from the parent object type. Radio buttons 1012 and 1014 provide selections for propagating the changes and not propagating the changes to the child object types, respectively. For example, a system administrator may choose which object type changes are propagated to other sites and which changes are not propagated. In one embodiment, the propagation of changes may only be in the direction of parent object to child object, where changes made to an object type, such as a site content type, at a higher level site is propagated down to a corresponding object type at a lower level site. In another implementation, the propagation of changes may be bi-directional, where changes made to an object type at a lower level site is propagated up to a corresponding object type at a higher level site.

In another embodiment, a site administrator who chooses not to update an object type, such as a site content type, at the site which he administers, may refuse update of the object type. The refusal of update of an object type at a given site is an action that may be taken at a destination site in an update process. The update propagation options provided by radio buttons 1012 and 1014 is an action that may be taken at a source site of an update process where the initial changes to the object type take place. For example, with reference to FIG. 7A, if an object type is modified at a source site, such as site 702, the administrator of site 702 may elect to propagate this change to other destination sites, such as site 708, by selecting the Yes radio button 1012. The administrator at the destination site 708 may choose to refuse update of the object type at the destination site 708 corresponding to the object type modified at the source site 702, and thus disallow the changes to the object type at the source site 702 to propagate to the corresponding object type at the destination site 708.

In another embodiment, an object type may be locked to prevent changes to the object type. Locking an object type prevents local customization of the object type at all sites. For example, if an information technology ("IT") department wants to enforce an object type, such as a single task object type, throughout an organization, the IT department can lock the task object type, thus preventing the customization of the task object type at other sites in the hierarchy of data sites 700.

Figure 11:
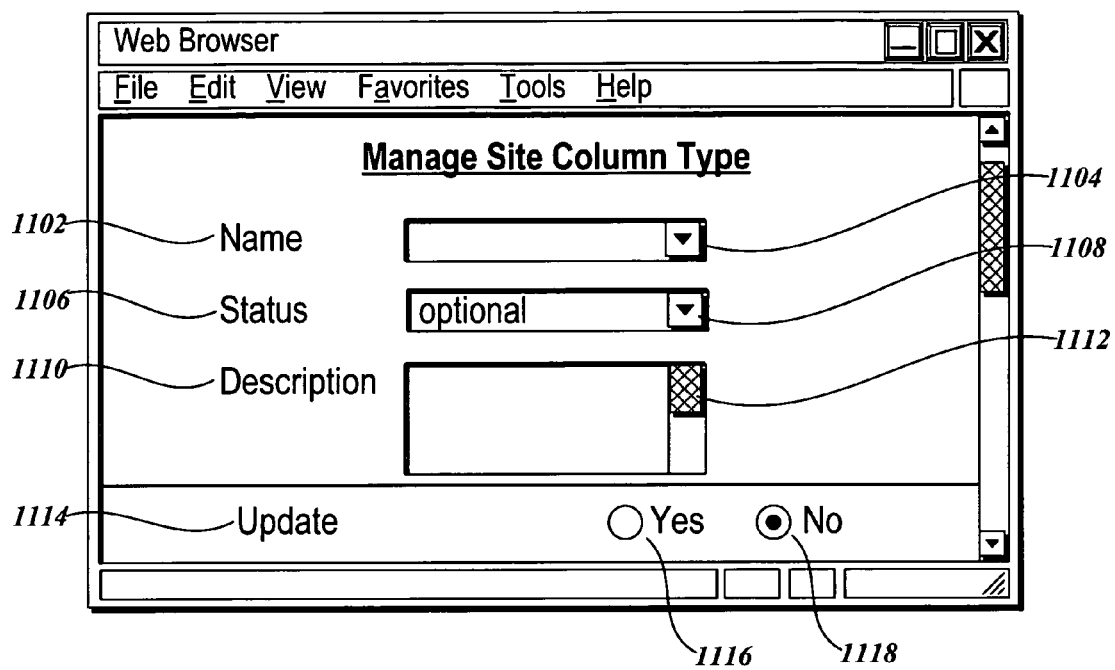
FIG. 11 is a pictorial diagram of an exemplary user interface for managing a site column update.

FIG. 11 is a pictorial diagram of an exemplary user interface 1100 for managing a site column update. Column type name 1102 provides an identifier for a site column type displayed in a pick-list 1104. A status 1106 indicates whether the column identified by name 1102 is optional or required. A description 1110 of the site column type is displayed in a multi-line text box 1112. An Update section 1114 is used to indicate whether to propagate the changes made in the parent object type, that is, the site column type, to child object types that were derived from the parent object type. Radio buttons 1116 and 1118 provide selections for choosing between propagating the changes and not propagating the changes to the child object types, respectively. For example, a system administrator may choose which object type updates are propagated to other sites and which updates are not propagated. In one implementation, the propagation of changes may only be in the direction of parent object to child object, where changes made to an object type, such as a site column type, at a higher level site is propagated down to a corresponding object type at a lower level site. In another implementation, the propagation of changes may be bi-directional, where changes made to an object type at a lower level site is propagated up to a corresponding object type at a higher level site. In one embodiment, site column types may refuse update to prevent changes from propagating to local site column types, as discussed above with respect to site content types.

Figure 12:
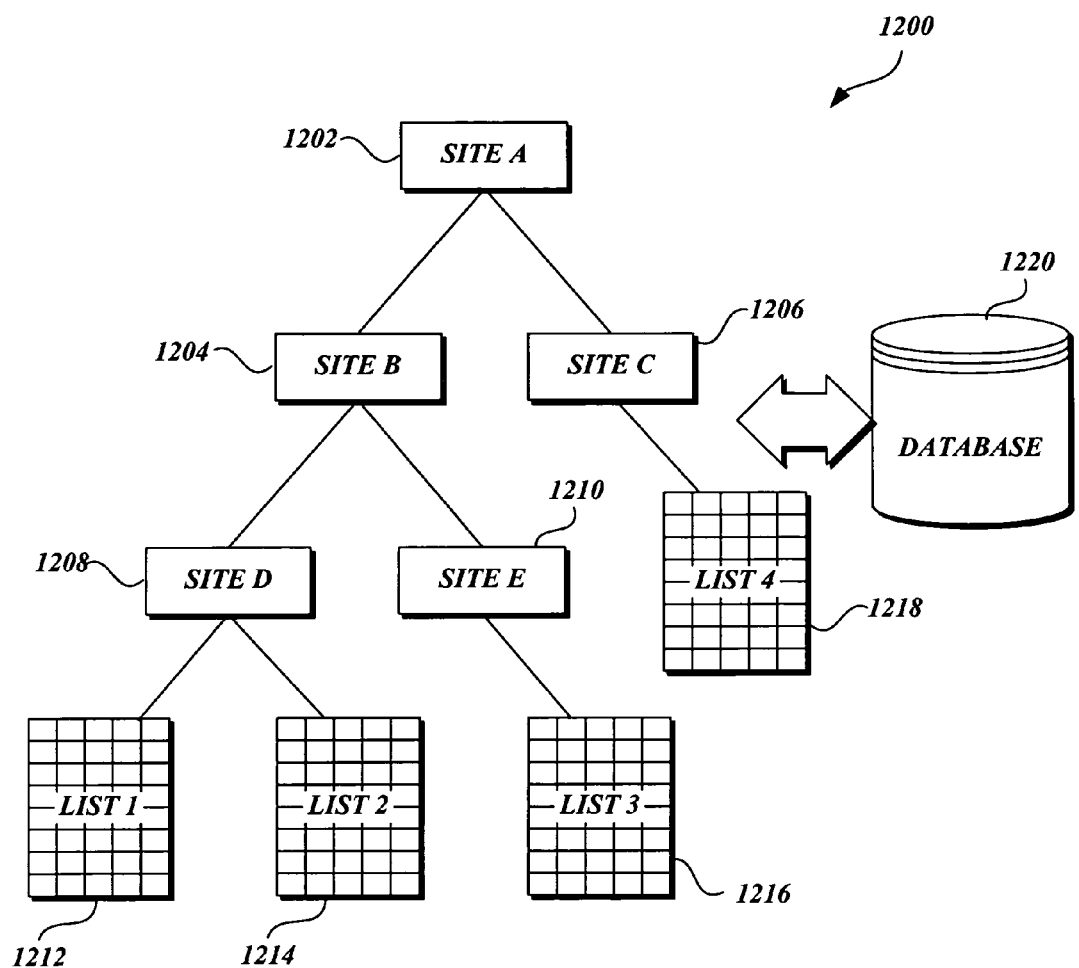
FIG. 12 is a pictorial diagram of an exemplary hierarchy of data sites and a back-end database.

In one embodiment, the information about the modifications to a parent object type, such as a site content type or a site column type, is stored in a global database, which is accessible from all sites in a hierarchy of data sites. FIG. 12 is a pictorial diagram of an exemplary hierarchy of data sites 1200 and a back-end database 1220. As described above, a site at a higher level of the hierarchy 1200, such as site 1202, may include a parent object type, such as a site content type or a site column type. A modification to the parent object type is recorded in the back-end global database 1220. During an update operation, a site at a lower level of the hierarchy 1200, such as sites 1204-1210, may update a child object type derived from the parent object type according to the modifications to the parent object type as recorded in the database 1220. Similarly, lists 1212-1218 may update a child object, such as a list content type and list column type, derived from the parent object type according to the modifications to the parent object type as recorded in the database 1220. In one embodiment, only the granular changes made to the definitions of the parent object type are recorded in the database 1220 and propagated to the corresponding derived child object types at other sites, as opposed to recording and propagating the entire definition of the modified parent object types. In another implementation, the entire definition of the modified parent object types are propagated to the corresponding derived child object types at other sites. Yet in another implementation, the object type definitions may be recursively propagated to data sites at successively lower levels of the hierarchical data site 700. For example, a definition of an object type may be propagated from site 702 to site 704. Site 704 may recursively propagate the same or a modified definition of the object type to site 108.

Figure 13:
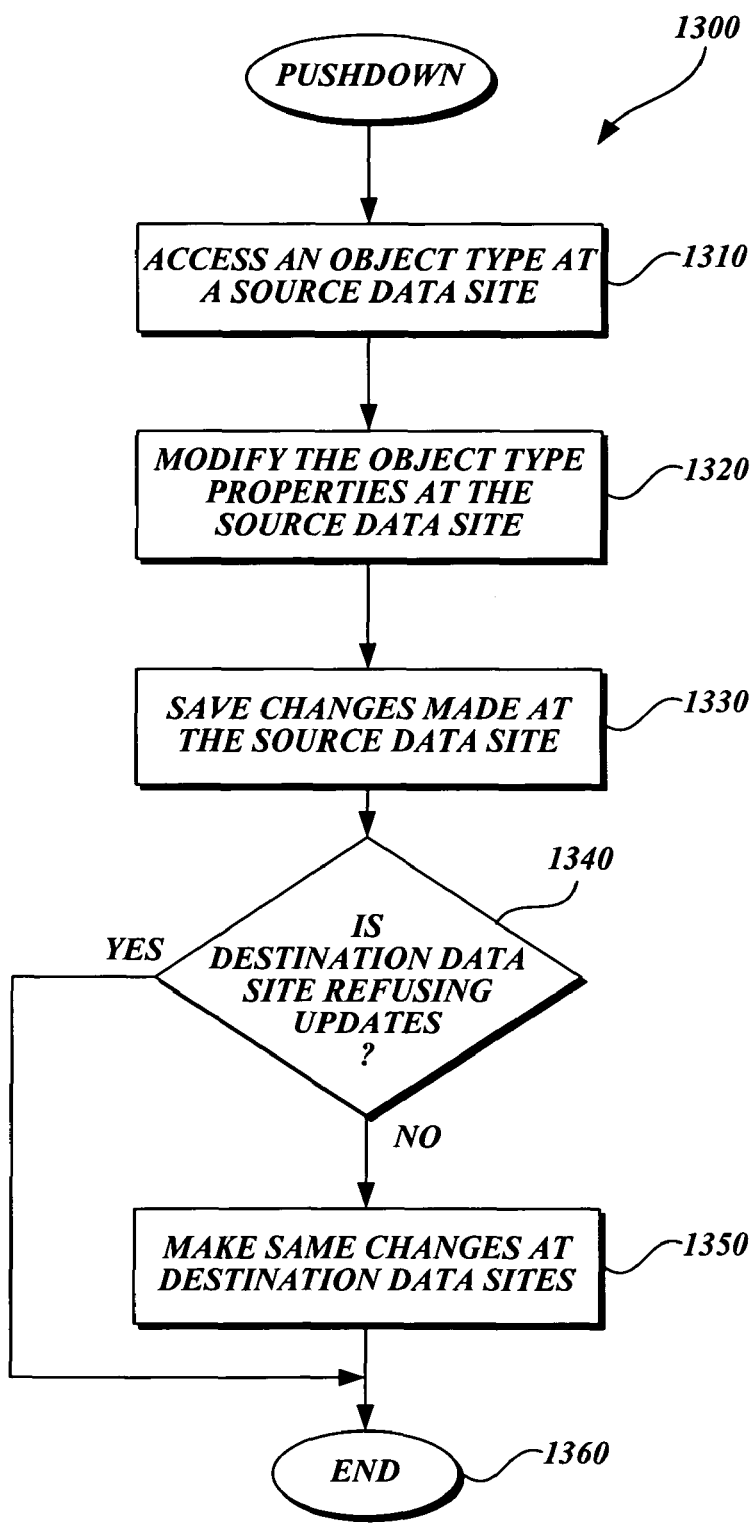
FIG. 13 is a flow diagram of a method for pushing down changes from source to destination data sites.

FIG. 13 is a flow diagram of a method 1300 for pushing down changes from source to target data sites. Pushdown is the process of propagating changes made to a parent object type to a corresponding child object type. For example, changes made to a parent object type, such as a site content type, at site 1302 are pushed down to a child object type at site 1304 according the method 1300. The method 1300 starts at block 1310 where an object type, such as a site content type or site column type, is accessed at a source data site. The method proceeds to block 1320 where the accessed object type is modified at the source data site. The changes made to the accessed object type include changes to object type data fields as well as object type behaviors embodied in software functions. In one embodiment, changes are made to the accessed object type by executing a block of software code. For example, a function is called to create a pointer to the accessed object type and the pointer is used to call other functions to add or modify fields in the access object type. At block 1330, the changes made to the accessed object type are saved. In one embodiment, the changes are saved to a global data base 1220. In another implementation, the changes are saved in a file on a file system. In yet another implementation, the changes are saved in a local database at the source data site, which is synchronized with other local databases at destination data sites. At block 1340, the method 1300 determines whether a destination data site is refusing updates. If a destination data site refuses updates, the method 1300 proceeds to block 1360 and terminates. If the destination data site is not refusing updates, the method 1300 proceeds to block 1350. At block 1350, the changes made to the accessed object type at the source data site are made to a corresponding object type at the destination data site. In one embodiment, the changes are made by calling an update function that repeats the calls to the functions above to make the same changes to the corresponding object type at the destination data site.

Figure 14:
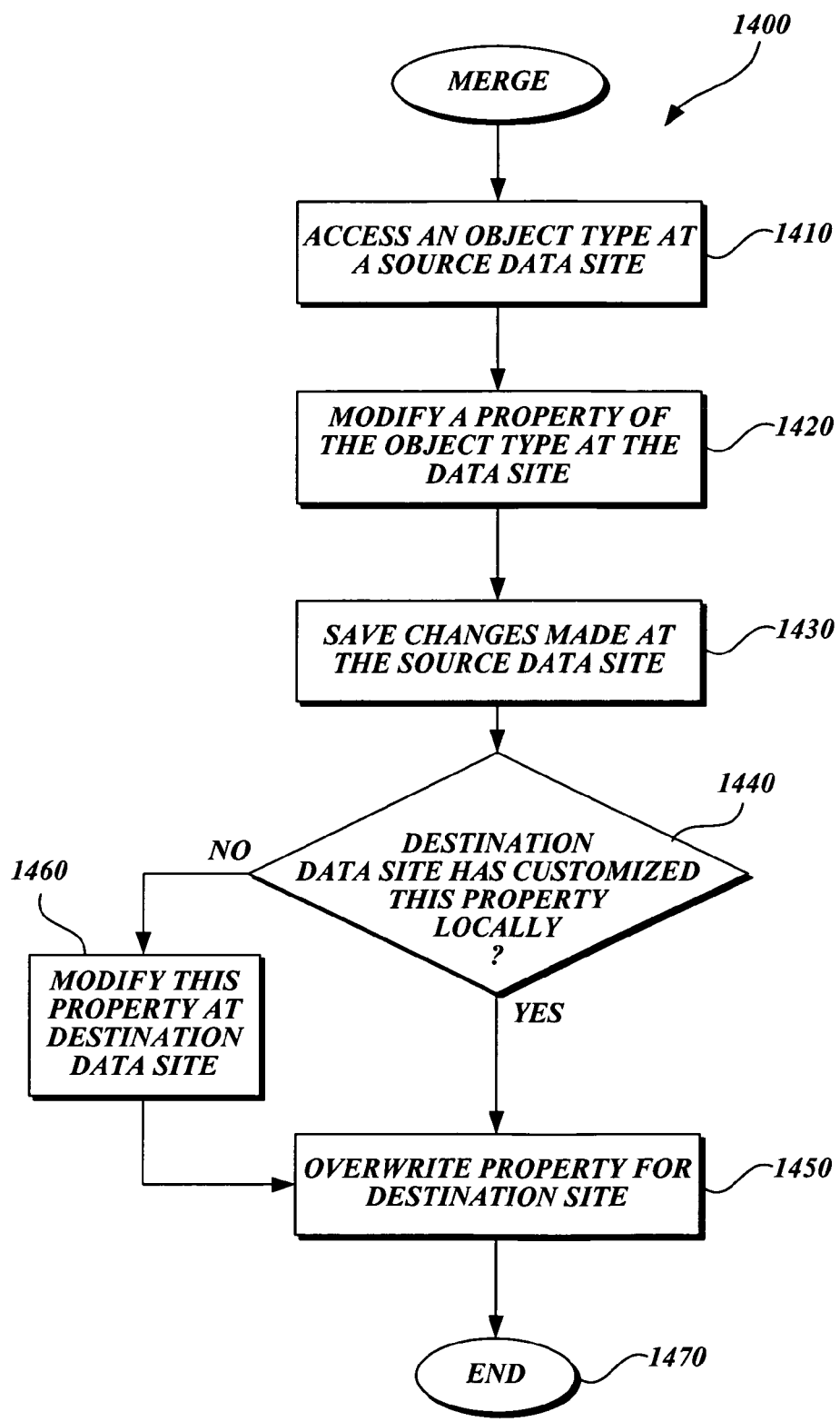
FIG. 14 is a flow diagram of a method for merging a modified property of an object type at a source data site with a corresponding object type at a destination data site.

FIG. 14 is a flow diagram of a method 1400 for merging an object type with a modified property at a source data site with a corresponding object type at a destination data site. Merge is the process whereby a locally customized property, that is, a modified object type property at a destination data site is updated according to the changes made to the same object type property at a source data site. The method 1400 starts at block 1410 where an object type is accessed at a source data site. The method 1400 proceeds to block 1420 where a property of the object type, such as a data field or behavior of the object type, at the source data site is modified. At block 1430, the changes to the property of the object type are saved. In one embodiment, the changes are saved to a global data base 1420. In another implementation, the changes are saved in a file on a file system. In yet another implementation, the changes are saved in a local database at the source data site, which is synchronized with other local databases at destination data sites. At block 1440, the method 1400 determines whether a destination data site has customized the property locally. If the property has been customized at the destination data site, the method 1400 proceeds to block 1450 where the property is overwritten by the changes made at the source data site. If the property has not been customized, the method 1400 proceeds to block 1460 where the changes to the property made at the source data site are duplicated at the destination data site. The method 1400 proceeds to block 1470 from blocks 1450 and 1460 where the method terminates.

In one embodiment, only the properties that were modified at the source data site are propagated to the destination data site. In such a case, if a destination data site has modified a different property of an object type locally, the different property will remain unchanged at the destination data site while the changes in the property which was modified at the source data site are propagated to the object type at the destination data site. In another embodiment, all properties of an object type at a destination data site are replaced by the properties of a corresponding object type at a source data site upon merge.

While the preferred embodiment of the invention has been illustrated and described, it will be appreciated by those skilled in the art that various changes can be made therein without departing from the spirit and scope of the invention. For example, while the systems and methods described above are directed towards Web servers, other types of hierarchical data sites may benefit from the hierarchical management of object type schema and behavior.

The invention claimed is:

1. A method performed by at least one computer having computer-executable instructions for reusing an object type in a computing environment, the method comprising:
   receiving notification of modifications made to a source object type stored at a source data site, the source object type comprising a source schema, wherein the modifications comprise granular modifications made to the source schema of the source object type at the source data site;
   determining whether a destination data site storing a destination object type is refusing updates for the destination object type, wherein the destination object type comprises a destination schema, wherein the destination object type at the destination data site is a child of the source object type at the source data site, and wherein the destination data site is different from the source data site;
   upon determining that the destination data site is not refusing updates for the destination object type, accepting at the destination data site the granular modifications made to the source object type;
   determining whether one or more properties of the destination object type include one or more locally customized properties, wherein the one or more locally customized properties are properties of the destination schema;
   applying the granular modifications to the destination schema of the destination object type at the destination data site by overwriting a first property of the one or more locally customized properties of the destination object type with the granular modifications and leaving unchanged a second property of the one or more locally customized properties of the destination object type, wherein the one or more locally customized properties are different from a corresponding one or more properties of the source object type at the source data site;
   receiving at the destination data site an additional local customization to a third property of the destination schema of the destination object type;
   determining at the destination data site that the third property has been locked by the source data site; and
   refusing to apply the additional local customization to the third property.

2. The method of claim 1 wherein the source object type further comprises behaviors of the source object type.

3. The method of claim 2 wherein the source object type and the destination object type comprise one of a Web site content type and a Web site column type.

4. The method of claim 3 wherein the source object type and the destination object type comprise a Web site content type comprising a template for a table of heterogeneous items.

5. The method of claim 4 wherein the Web site column type is a column in the template for the table of heterogeneous items.

6. The method of claim 5 wherein the Web site content type and the Web site column type are copied from the source object type at the source data site to and used in a plurality of destination object types at a corresponding plurality of destination data sites.

7. The method of claim 3 further comprising copying the source object type from the source data site to a plurality of destination data sites and applying the granular modifications made to the schema of the source object type at the source data site to destination object types at the plurality of destination data sites.

8. A computer system for managing object type behavior, comprising:
   at least one processor; and
   at least one memory, communicatively coupled to the at least one processor and containing computer-readable instructions that are executed by the at least one processor to perform the following steps:
      receiving notification of modifications made to a source object type stored at a source data site, the source object type comprising a source schema, wherein the modifications comprise granular modifications made to the source schema of the source object type at the source data site;
      determining whether a destination data site storing a destination object type is refusing updates for the destination object type, wherein the destination object type comprises a destination schema, wherein the destination object type at the destination data site is a child of the source object type at the source data site, and wherein the destination data site is different from the source data site;
      upon determining that the destination data site is not refusing updates for the destination object type, accepting at the destination data site the granular modifications made to the source object type;
      determining whether one or more properties of the destination object type include one or more locally customized properties, wherein the one or more locally customized properties are properties of the destination schema;
      applying the granular modifications to the destination schema of the destination object type at the destination data site by overwriting a first property of the one or more locally customized properties of the destination object type with the granular modifications and leaving unchanged a second property of the one or more locally customized properties of the destination object type, wherein the one or more locally customized properties are different from a corresponding one or more properties of the source object type at the source data site;

receiving at the destination data site an additional local customization to a third property of the destination schema of the destination object type;

determining at the destination data site that the third property has been locked by the source data site; and refusing to apply the additional local customization to the third property.

9. The computer system of claim 8 wherein the source object type at the source data site and the destination object type at the destination data site comprise one of a Web site content type and a Web site column type.

10. The computer system of claim 9 wherein the Web site content type comprises a template for a table of heterogeneous items.

11. The computer system of claim 10 wherein the Web site column type is a column in the template for the table of heterogeneous items.

12. The computer system of claim 11 wherein the Web site content type and the Web site column type are copied from the source object type at the source data site to and used in a plurality of destination object types at a corresponding plurality of destination data sites.

13. The computer system of claim 10 further comprising:
modifying a behavior of the source object type at the source data site; copying the source object type from the source data site to a plurality of destination data sites; and applying the granular modifications made to the behavior of the source object type at the source data site to destination object types at the plurality of destination data sites.

14. The computer system of claim 8 wherein rejecting the granular modifications is by one of a destination site administrator and an automatic message.

15. A computer-readable storage medium containing computer-executable code for managing object type schema, the computer-executable code executing a method comprising:
receiving notification of modifications made to a source object type stored at a source data site, the source object type comprising a source schema, wherein the modifications comprise granular modifications made to the source schema of the source object type at the source data site;

determining whether a destination data site storing a destination object type is refusing updates for the destination object type, wherein the destination object type comprises a destination schema, wherein the destination object type at the destination data site is a child of the source object type at the source data site, and wherein the destination data site is different from the source data site;

upon determining that the destination data site is not refusing updates for the destination object type, accepting at the destination data site the granular modifications made to the source object type;

determining whether one or more properties of the destination object type include one or more locally customized properties, wherein the one or more locally customized properties are properties of the destination schema;

applying the granular modifications to the destination schema of the destination object type at the destination data site by overwriting a first property of the one or more locally customized properties of the destination object type with the granular modifications and leaving unchanged a second property of the one or more locally customized properties of the destination object type, wherein the one or more locally customized properties are different from a corresponding one or more properties of the source object type at the source data site;

receiving at the destination data site an additional local customization to a third property of the destination schema of the destination object type;

determining at the destination data site that the third property has been locked by the source data site; and refusing to apply the additional local customization to the third property.

16. The computer-readable storage medium of claim 15 wherein the source object type further comprises behaviors of the source object type.

17. The computer-readable storage medium of claim 16 wherein the source object type at the source data site and the destination object type at the destination data site comprise one of a Web site content type and a Web site column type.

18. The computer-readable storage medium of claim 17 wherein the Web site content type comprises a template for a table of heterogeneous items.

19. The computer-readable storage medium of claim 18 wherein the Web site column type is a column in the template for the table of heterogeneous items.

20. The computer-readable storage medium of claim 19 wherein the Web site content type and the Web site column type are copied to and used in multiple data sites.

* * * * *

UNITED STATES PATENT AND TRADEMARK OFFICE
CERTIFICATE OF CORRECTION

PATENT NO. : 7,966,286 B2  
APPLICATION NO. : 11/305050  
DATED : June 21, 2011  
INVENTOR(S) : Jason Morrill et al.

Page 1 of 1

It is certified that error appears in the above-identified patent and that said Letters Patent is hereby corrected as shown below:

In column 15, line 27, in Claim 13, delete "10" and insert -- 9 --, therefor.

Signed and Sealed this
Sixteenth Day of August, 2011

David J. Kappos
*Director of the United States Patent and Trademark Office*